(12) United States Patent
Spijkerman

(10) Patent No.: US 10,477,829 B2
(45) Date of Patent: Nov. 19, 2019

(54) METHOD AND SYSTEM FOR PRESSING OUT WHEY FROM CURD

(71) Applicant: TETRA LAVAL HOLDINGS & FINANCE S.A., Pully (CH)

(72) Inventor: Harrie Spijkerman, LP Wapenveld (NL)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 340 days.

(21) Appl. No.: 15/323,832

(22) PCT Filed: Jul. 6, 2015

(86) PCT No.: PCT/EP2015/065307
§ 371 (c)(1),
(2) Date: Jan. 4, 2017

(87) PCT Pub. No.: WO2016/005308
PCT Pub. Date: Jan. 14, 2016

(65) Prior Publication Data
US 2017/0142926 A1 May 25, 2017

(30) Foreign Application Priority Data
Jul. 7, 2014 (SE) ...................................... 1450864

(51) Int. Cl.
*A01J 25/11* (2006.01)
*A01J 25/13* (2006.01)
*A01J 25/15* (2006.01)

(52) U.S. Cl.
CPC ............. *A01J 25/115* (2013.01); *A01J 25/13* (2013.01); *A01J 25/15* (2013.01)

(58) Field of Classification Search
CPC ........... A01J 25/115; A01J 25/13; A01J 25/15
See application file for complete search history.

(56) References Cited

U.S. PATENT DOCUMENTS 8,512,792 B2 * 8/2013 Spijkerman ............. A01J 25/12
426/582
2003/0155415 A1 * 8/2003 Markham .............. G06Q 10/00
235/376

(Continued)

FOREIGN PATENT DOCUMENTS

CH          642824    *   5/1984
WO    WO 2010/050812 A2    5/2010

OTHER PUBLICATIONS

English Translation for CH642824 published May 1984.*

(Continued)

*Primary Examiner* — Anthony J Weier
(74) *Attorney, Agent, or Firm* — Buchanan Ingersoll & Rooney PC

(57) ABSTRACT

A method for pressing out whey from curd is presented. The method includes receiving a closed casing holding a mold filled with curd, pumping out air from the closed casing such that a pressure force onto the curd can be formed, establishing a connection between a system controller and a casing controller provided in the casing, uploading instructions from the system controller to the casing controller on how to change the pressure during a pressing cycle by opening a valve on the casing, de-establishing the connection between the system controller and the casing controller, and storing the closed casing and executing the instructions uploaded to the closed casing such that whey is pressed out from the curd and a cheese is formed from the curd.

19 Claims, 10 Drawing Sheets

(56) References Cited

U.S. PATENT DOCUMENTS

2008/0201241 A1* 8/2008 Pecoraro ............... G06Q 30/06
                                                                             705/26.8
2011/0262604 A1* 10/2011 Spijkerman ............. A01J 25/12
                                                                             426/389

OTHER PUBLICATIONS

International Search Report (PCT/ISA/210) dated Oct. 16, 2015, by the European Patent Office as the International Searching Authority for International Application No. PCT/EP2015/065307.
Written Opinion (PCT/ISA/237) dated Oct. 16, 2015, by the European Patent Office as the International Searching Authority for International Application No. PCT/EP2015/065307.
Office Action issued by Swedish Patent Office dated Jan. 22, 2015, in Swedish Application No. 1450864-2. (8 Pgs).

* cited by examiner

METHOD AND SYSTEM FOR PRESSING OUT WHEY FROM CURD

TECHNICAL FIELD

The present patent application generally relates to the field of cheese production. More particularly, it is presented a system and a method for cheese production with lower operational costs, high reliability and high hygienic standard.

BACKGROUND OF THE INVENTION

Today, within large scale production of semi-hard and hard cheese the process can be divided in the following main steps: preparing a mixture of curd and whey by treating milk and adding rennet or another type of coagulant, dosing the curd and whey mixture into moulds, pressing the mixture in order to create a cheese by removing a great part of the whey, brining the cheese in a salty bath and finally ripening the cheese. Variations of this approach may occur depending for instance on the type of cheese to be produced.

The whey released during the pressing step is most often in modern cheese production plants carefully taken care of such that this can be turned into whey powder and later be used in other food products, such as protein enriched beverages. An effect of that this by-product is used for food products is that there is an increased interest from cheese producers to make sure that also the by-product, i.e. the whey, is collected and taken care of hygienically such that this can be sold as an ingredient fulfilling premium food quality standards.

In addition to making sure that the whey is taken care of hygienically and thereby that as much of the outcome of the production can be used in food products, there is a general interest from cheese producers to make sure that the operational costs of the production is kept as low as possible. Further, there is also an interest from the cheese producers to make sure that the cheese production system is too as small extent as possible reliable of a single component, thereby reducing the risk of a system shut down caused by the single component.

SUMMARY

Accordingly, presented methods and systems seek to mitigate, alleviate or eliminate one or more of the above-identified deficiencies in the art and disadvantages singly or in any combination and solves at least the above mentioned problems.

According to a first aspect it is provided a method for pressing out whey from curd, said method comprising receiving a closed casing holding a mould filled with curd, pumping out air from said closed casing such that a pressure force onto said curd can be formed, establishing a connection between a system controller and a casing controller provided in said casing, uploading instructions from said system controller to said casing controller on how to change said pressure during a pressing cycle by opening a valve on said casing, de-establishing said connection between said system controller and said casing controller, storing said closed casing and executing said instructions uploaded to said closed casing such that whey is pressed out from said curd and a cheese is formed from said curd.

The pressure force onto said curd may be formed by having a first space between a lid placed on top of said curd and a movable element and a second space between said movable element and said casing, wherein a pressure difference between said first space and said second space provides for that said movable element is pressed onto said lid such that in turn said pressure force is formed onto said curd.

The moveable element may be a membrane.

The method may further comprise receiving curd related data relating to said curd by said system controller, preparing said instructions by taking into account said curd related data.

The method may further comprise identifying said mould by reading a mould identification tag placed on said mould, and preparing said instructions based on mould properties related to said mould.

The mould identification tag may be an RFID tag.

The method may further comprise identifying said casing by reading a casing identification tag placed on said casing, and preparing said instructions based on casing properties related to said casing.

The casing identification tag may be an RFID tag.

The method may further comprise receiving said closed casing after whey has been pressed out from said curd, establishing a connection between said system controller and said casing controller placed in said casing, downloading parameter data related to said pressing from said casing controller to said system controller, de-establishing said connection between said system controller and said casing controller.

The method may further comprise adapting said instructions based on said parameter data.

The method may further comprise detecting a deviation in said pressing when executing said instructions, establishing a connection between said system controller and said casing controller placed in said casing, downloading parameter data related to said pressing from said casing controller to said system controller, de-establishing said connection between said system controller and said casing controller.

According to a second aspect it is provided a system for pressing out whey from curd, said system comprising a casing holding a mould filled with curd, wherein said casing is provided with at least one connection pipe such that air can be pumped out from said casing such that a pressure force onto said curd can be formed, a valve such that air can be let in to said casing, and a casing controller controlling said valve, a pump apparatus arranged to pump out air from said casing via said at least one connection pipe, a system controller arranged to process data, a data transfer apparatus arranged to provide a connection between said casing controller and said system controller for uploading instructions from said system controller to said casing controller on how to change said pressure force by opening said valve on said casing.

The pressure force onto said curd may be formed by having a first space between a lid placed on top of said curd and a movable element and a second space between said movable element and said casing, wherein a pressure difference between said first space and said second space provides for that said movable element is pressed onto said lid such that in turn said pressure force is formed onto said curd.

The moveable element may be a membrane.

The system controller may further be configured to receive curd related data relating to said curd, and prepare said instructions by taking into account said curd related data.

The system may further comprise a mould identification tag reader arranged for identifying said mould by reading a mould identification tag placed on said mould, and said system controller configured to retrieve mould properties related to said mould from a mould database by using said mould identification tag and prepare said instructions based on mould properties.

The system may further comprise a casing identification tag reader arranged for identifying said casing by reading a casing identification tag placed on said casing, and said system controller configured to retrieve casing properties related to said casing from a casing database by using said casing identification tag and prepare said instructions based on casing properties.

The data transfer apparatus may further be configured to provide a connection between said system controller and said casing controller after whey has been pressed out from said curd for downloading parameter data related to said pressing cycle from said casing controller to said system controller.

The system controller may further be configured to adapt said instructions based on said parameter data.

The instructions may be adapted to said casing individually.

The data transfer apparatus may further be configured to provide a connection between said system controller and said casing controller, if a deviation in said pressing cycle is detected, for downloading parameter data related to said pressing cycle from said casing controller to said system controller.

According to a third aspect it is provided a casing for holding a mould with curd, said casing comprising at least one connection pipe providing for that air can be pumped out from said casing such that in turn a pressure force onto said curd can be formed, a valve providing for that air can be let in to said casing, and a casing controller controlling said valve.

The casing may further comprise a casing identification tag providing a unique identification for said casing.

The casing may further comprise a communications module for wireless data communication.

The casing may further comprise an energy source, such as a battery.

The casing may further comprise an energy source charging device using a flow of air between a first space and a second space of said casing, or between an interior and an exterior of said casing.

BRIEF DESCRIPTION OF THE DRAWINGS

The above, as well as additional objects, features and advantages will be better understood through the following illustrative and non-limiting detailed description of embodiments with reference to the appended drawings, wherein.

DETAILED DESCRIPTION OF PREFERRED EMBODIMENTS

Figure 1:
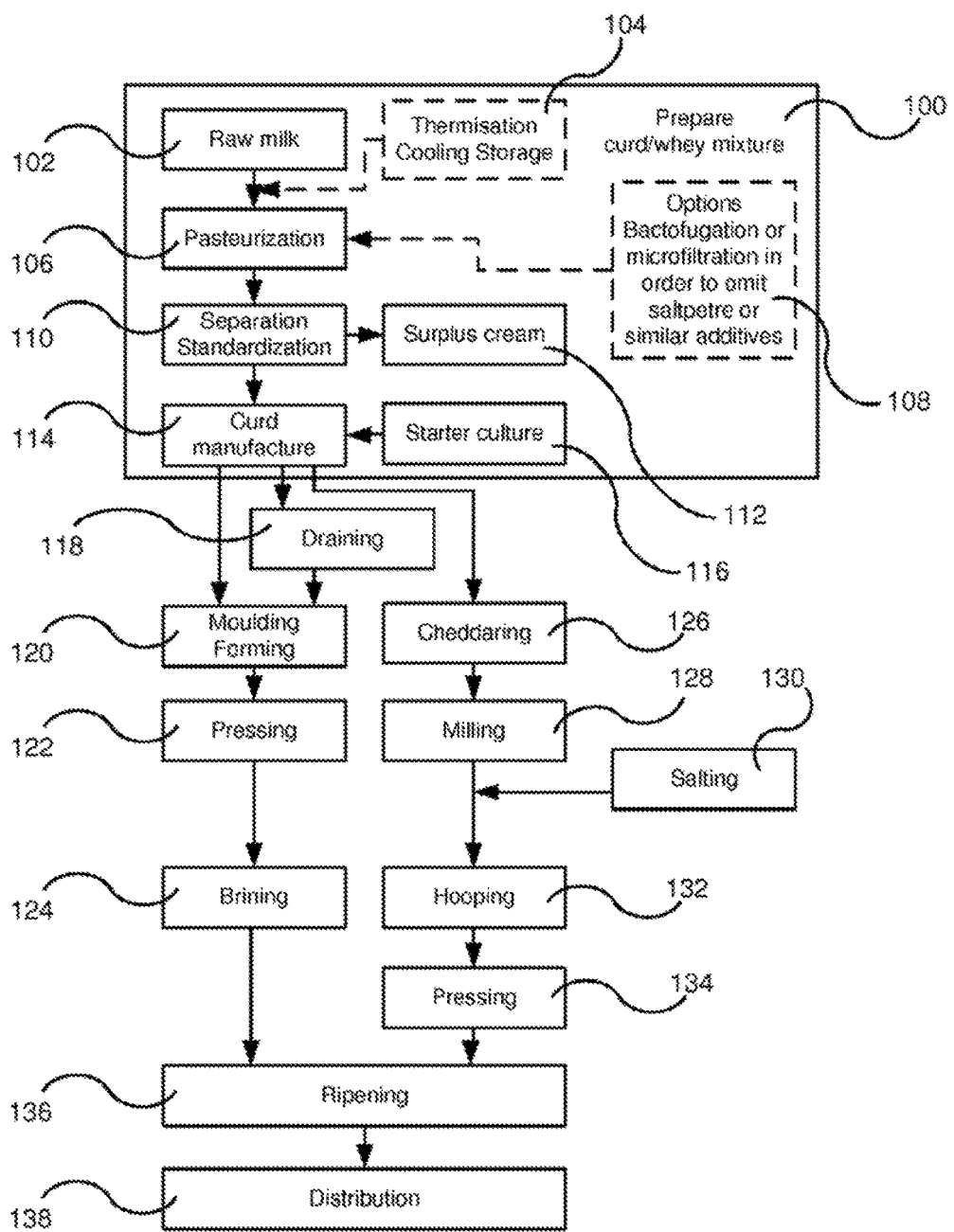
FIG. 1 illustrates an overview of steps involved in cheese production.

FIG. 1 illustrates general steps for producing hard, semi-hard and cheddar cheese. Depending on which type of cheese to produce, the steps and/or the order of the steps may vary. The process flow illustrated in FIG. 1 is not an exhaustive process flow taken all different types of cheese into account, rather an example of how the process may look and that it may vary for different types of cheeses.

In a first step 100 a curd and whey mixture is prepared. More specifically, this first step 100 can comprise a step 102 of receiving raw milk. If the raw milk is not processed directly, the raw milk can in step 104 be stored and thermised. In step 106 the raw milk can be pasteurized in order to kill unwanted microorganisms, especially pathogenic types. Instead of pasteurization or as a complement thereto a step 108 of bactofugation may be used. Next, in a step 110 the milk can be separated and standardized, and in a step 112 surplus cream may be taken care of. When having a standardized milk, in a step 114, curd and whey mixture can be manufactured by, in a step 116, adding a starter culture, e.g. rennet.

Thereafter, when having prepared the curd and whey mixture, depending on which cheese to produce different further steps are taken. For some cheese types, in a step 118, the curd and whey mixture can be drained, e.g. in a cheese vat, in a pre-press vat or in a cheese column.

After having drained the curd and whey mixture, this can be, in a step 120, placed in moulds.

After having been placed in moulds, in a step 122, a pressure is applied in order to press out whey from the curd and whey mixture.

After having pressed out whey from the curd and whey mixture, the curd and whey mixture in the mould takes the form of a cheese, that is, a body keeping together on its own. The cheese can in a next step 124 be transferred to brining.

As illustrated in FIG. 1, an alternative to the process described with reference to steps 118 to 124, the curd and whey mixture can, in steps 126, 128, 130, 132, 134 being exposed to so-called cheddaring, milling, salting, hooping and pressing to become a cheddar or alike type of cheese.

After the step 124 or the step 134, the cheese can, in step 136, be transferred to ripening, and then for distribution, step 138.

Figure 2:
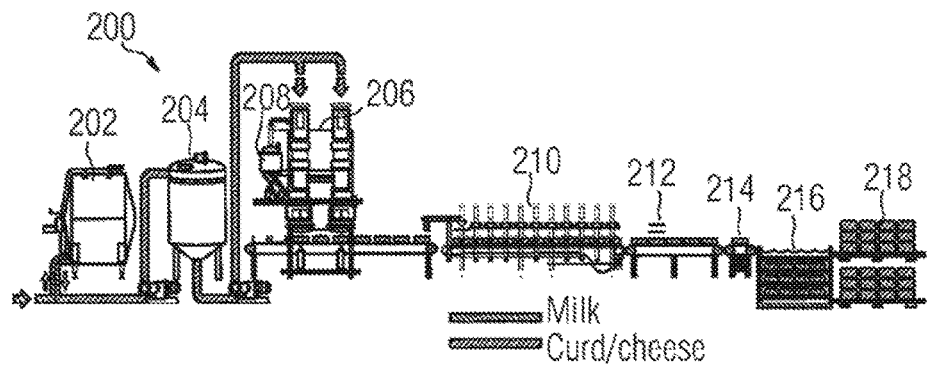
FIG. 2 illustrates a system for production of cheese.

FIG. 2 illustrates an example of a system 200 for mechanised production of Gouda cheese. In this example, based on pasteurized and standardized milk and a starter culture a curd and whey mixture is prepared in a cheese tank 202. When prepared, the curd and whey mixture is fed to a buffer tank 204 in which the curd and whey mixture can be stored.

In order to drain whey from the curd and whey mixture a continuous drainage column 206, e.g. a Tetra Tebel Casomatic marketed by Tetra Pak, can be used. Surplus whey can be caught in whey collecting tanks 208 connected to the continuous drainage column 206.

When leaving the continuous drainage column the curd and whey mixture is placed in moulds. Next, a lid can be placed on the curd and whey mixture in the mould (not illustrated in FIG. 2).

The moulds provided with lids can be fed to a pressing apparatus, in this particular example illustrated in FIG. 2, a conveyor press 210. When applying a pressure on the lid, the whey in the curd and whey mixture is pressed out via openings in the moulds. The openings are of a size such that the curd particles in the curd and whey mixture are retained in the mould when a pressure is applied on the lid, while the whey can pass through the openings.

After having pressed the curd and whey mixture, the curd and whey mixture has changed into a body keeping together on its own. Herein, in order to distinguish this stage from the previous stage, it is therefore from this stage of the process referred to as a cheese instead of curd and whey mixture.

Next, the lid is removed 212. In modern systems this is usually done by an apparatus, even though not illustrated in FIG. 2.

Thereafter, in order to make sure that the cheese weighs according to expectations the cheese is weighed by a weighing device 214.

After being weighed, the cheese is placed in a brine bath 216 and thereafter in a ripening store 218.

Figure 3:
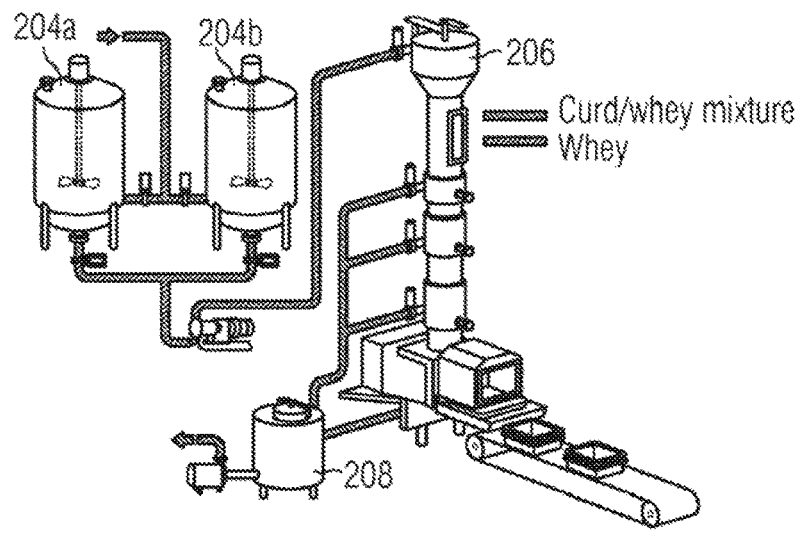
FIG. 3 illustrates a whey drainage system.

FIG. 3 illustrates a more detailed view of buffert tanks 204a, 204b, a continuous drainage column 206 and a whey collecting tank 208.

In order to avoid that the curd and whey mixture settle one or several agitators may be used in the buffert tanks 204a, 204b.

Due to gravity and hydraulic effect of the whey flowing through the bed of curd formed on the inside of the drainage column, whey is gradually pressed out from the curd and whey mixture as it passes through the column 206 experiencing an increased top load. As illustrated, whey may be collected at different sections.

Figure 4:
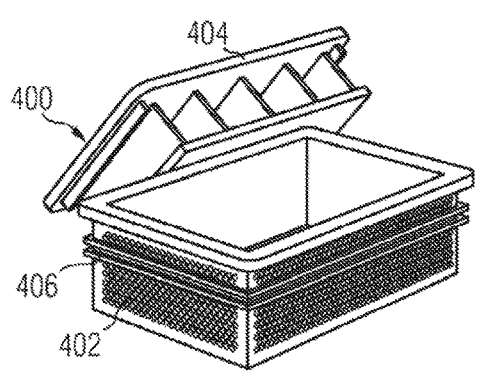
FIG. 4 illustrates a cheese mould.

FIG. 4 illustrates an example of a mould 400. In this example, the mould comprises a main part 402 comprising a bottom section and side walls provided with openings for retaining curd particles, but letting through whey. A lid 404 can be placed on the main part 402 after this has been filled with a curd and whey mixture. In order to strengthen the side walls of the main part, a metal section 406 may be provided.

Figure 5:
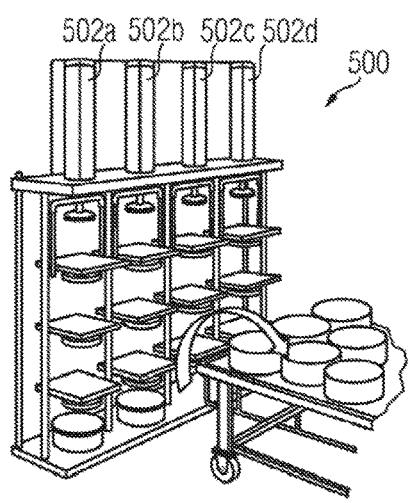
FIG. 5 illustrates traditional, manual cheese pressing.

In FIG. 5 a traditional, manual pressing equipment is disclosed. An alternative to using the conveyor press is to manually place the moulds filled with curd and whey mixture in a vertical pressing unit 500 having a number of pneumatic cylinders 502a, 502b, 502c, 502d for forming a pressure on lids placed on top of curd and whey mixture filled moulds.

Figure 6:
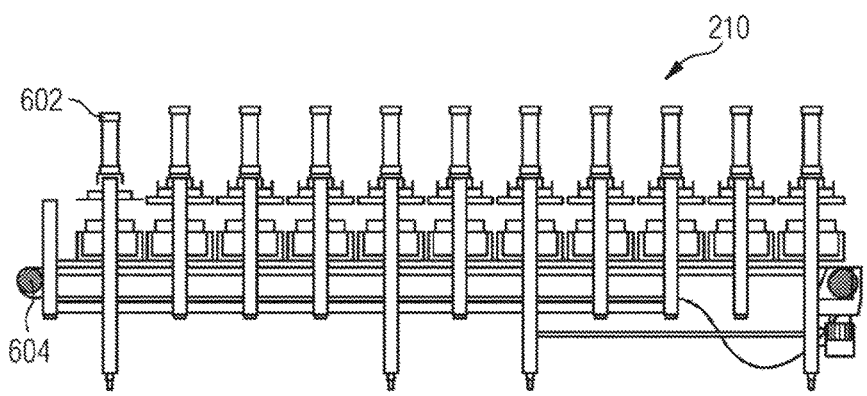
FIG. 6 illustrates a conveyor press.

FIG. 6 illustrates the conveyor press 210 of FIG. 2 in further detail. As in the vertical pressing unit 500 of FIG. 5, pneumatical cylinders 602 can be provided for forming the pressure. Unlike the vertical pressing unit 500, the moulds are placed separately (or sometimes stacked to limited heights) on a conveyor 604 and transferred without manual effort.

Figure 7:
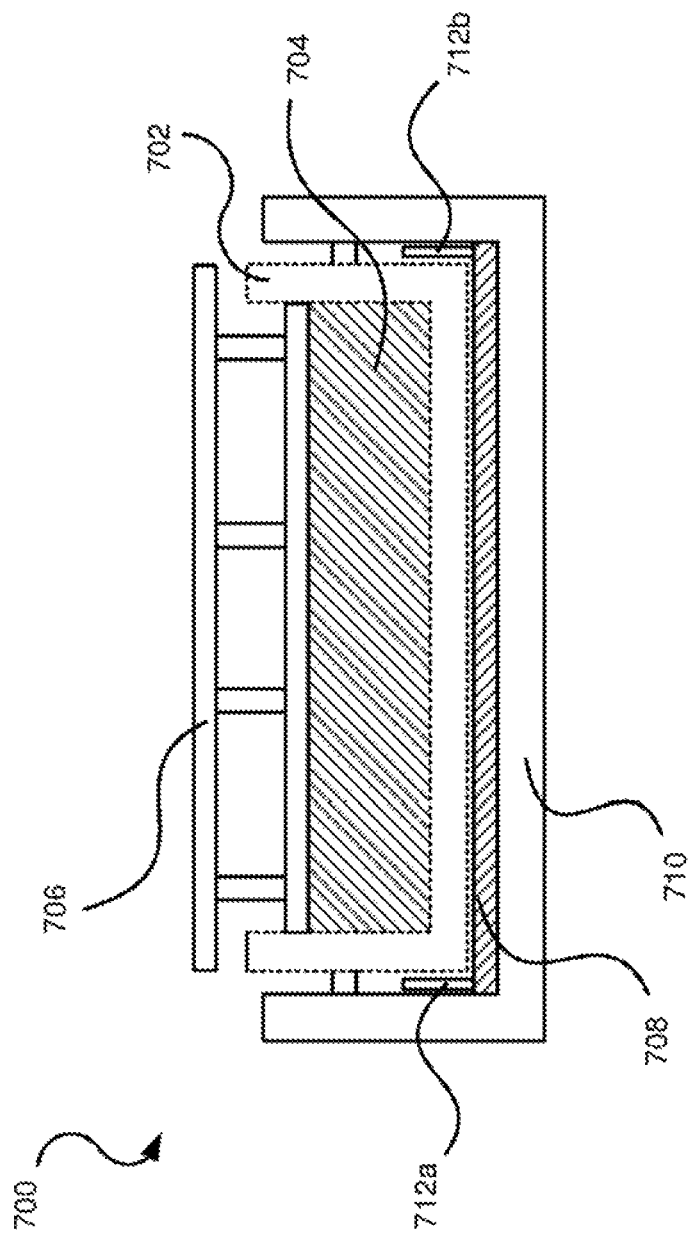
FIG. 7 illustrates a cross sectional view of a cheese mould.

FIG. 7 illustrates a cross sectional view of a mould 700 to a large extent similar to the one illustrated in FIG. 4. A main part 702 provided with openings for letting through whey, but keeping curd particles, is during pressing holding a curd and whey mixture 704. On top of the curd and whey mixture 704 it can be placed a lid 706 that is pressed down by e.g. a pneumatic cylinder (not illustrated). Pressed out whey 708 is collected in a tray 710. In order to measure how much whey that has been pressed out one or several liquid level sensors 712a, 712b may be used.

Figure 8:
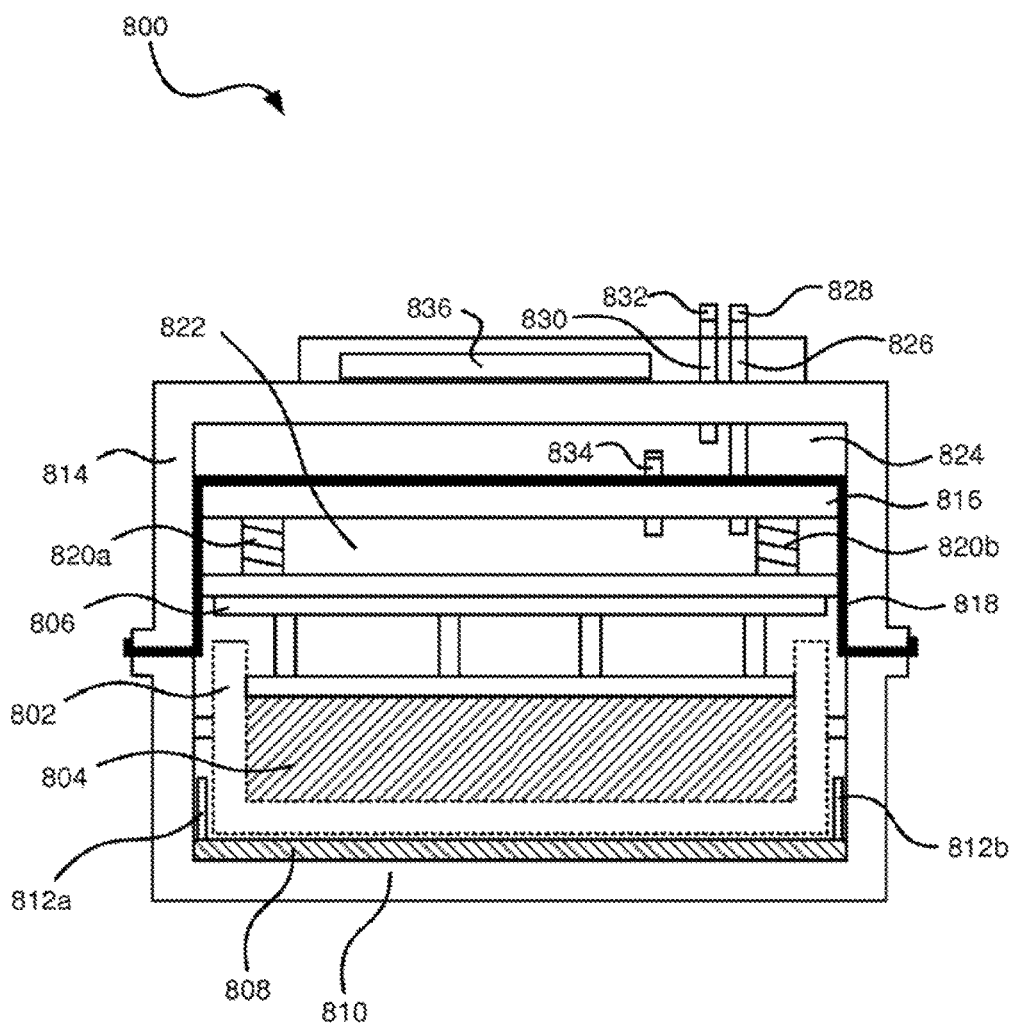
FIG. 8 illustrates a cross sectional view of a closed mould using vacuum for pressing out whey.

FIG. 8 illustrates a cross sectional view of an example of a device 800 comprising a main part 802 provided with openings for letting through whey, but retaining curd particles, configured to hold a curd and whey mixture 804. On top of the curd and whey mixture 804 it can be placed a lid 806 that is pressed down on the curd and whey mixture 804 such that whey 808 is pressed out and down into a tray 810. In order to keep track of the volume of pressed out whey liquid level sensors 812a, 812b can be placed in the tray 810. Alternatively during pressing the whey may be removed at a specific moment by opening a drain valve (not illustrated) and measuring the weight or volume of the drained whey.

In order to form a closed casing a cover 814 can be placed on top of the tray 810.

The pressure force pushing down the lid 806 can be formed by using gas pressure differences. In the illustrated example, a movable element 816 is placed between the lid 806 and a membrane 818, for instance a rubber membrane. The movable element 816 can comprise two plates being kept apart by a number of springs 820a, 820b. The springs 820a, 820b also provide for that the lid 806 is pushed down evenly.

On the bottom side of the membrane enclosed by the tray 810 a first space 822 is formed holding the main part 802 with the curd and whey mixture. By having a first connection pipe 826 provided with a first valve 828, a pump may be used for pumping out air from the first space 822, thereby lowering the gas pressure.

On the other side of the membrane 818, between the membrane 818 and the cover 814 a second space 824 is formed. In order to provide for that a gas pressure can be lowered in the second space 824 a second connection pipe 830 provided with a second valve 832 can be used. As the first connection valve 826, the second connection pipe can be connected to a pump such that air can be pumped out from the second space 824. In order to let in air, and thereby increasing the gas pressure in the second space 824, the second valve 832 can be opened.

Optionally, there may be a third connection pipe 834 provided with a third valve between the first space 822 and the second space 824. Having this third connection pipe air, or any other gas, may be transferred from the first space 822 to the second space 824, thereby reducing the pressure force formed by the pressure difference.

The pressing cycle may comprise a number of steps. In a first step air is pumped out from the first and second spaces 822,824 such that low pressure, being below atmospheric pressure, is formed in both spaces. By having the pressure in the second space 824 slightly higher than in the first space 822 a small pressure force can be formed.

After the initial pressing described above, when usually the pressure force is lower than in subsequent pressing, the pressure force can be increased by adjusting the second valve 832 attached to the second connection pipe 830 such that air is let into the second space 824 thereby increasing the gas pressure difference between the first space 822 and the second space 824, and as an effect increasing the pressure force applied onto the curd and whey mixture.

The number of steps and the duration and pressure for the steps may differ, but as an example it has been found that when producing a semi-hard cheese in the shape of a so-called Dutch wheel with a diameter of 386 mm it the pressing cycle can be divided in ten steps. These ten steps may have the duration periods 780 sec, 300 sec, 300 sec, 300 sec, 300 sec, 300 sec, 900 sec, 900 sec, 1200 sec and 60 sec. The pressure force used in this ten steps may be 0 g/cm2, 34 g/cm2, 56 g/cm2, 92 g/cm2, 120 g/cm2, 185 g/cm2, 248 g/cm2, 304 g/cm2, 330 g/cm2 and 83 g/cm2.

Based on information received from previously processed cheeses a temperature of the curd and whey mixture can be altered by lowering the pressure in the first space 822 such that a minute amount of the moisture on the curd is evaporated thus cooling down the curd and thus reducing further whey synereses of the curd particles.

A controller 836 may be part of the device 800. The controller 836 may be configured to collect information from gas pressure sensors (not illustrated) and/or from the liquid level sensors 812a, 812b and/or other sensors placed in the device 800. The controller 836 may also be configured to communicate via wire or wireless via a data communications network with a main controller or with a remote server, e.g. using ZigBee technology. Further, the controller 836 may be configured to send an alarm when gas pressure is lost or if something else unexpected occurs. Additionally, by continuously monitoring gas pressure as well as volume of pressed out whey and/or retained curd and whey mixture, the valves attached to the connection pipes may with the help of the controller be adjusted individually for the mould.

Figure 9:
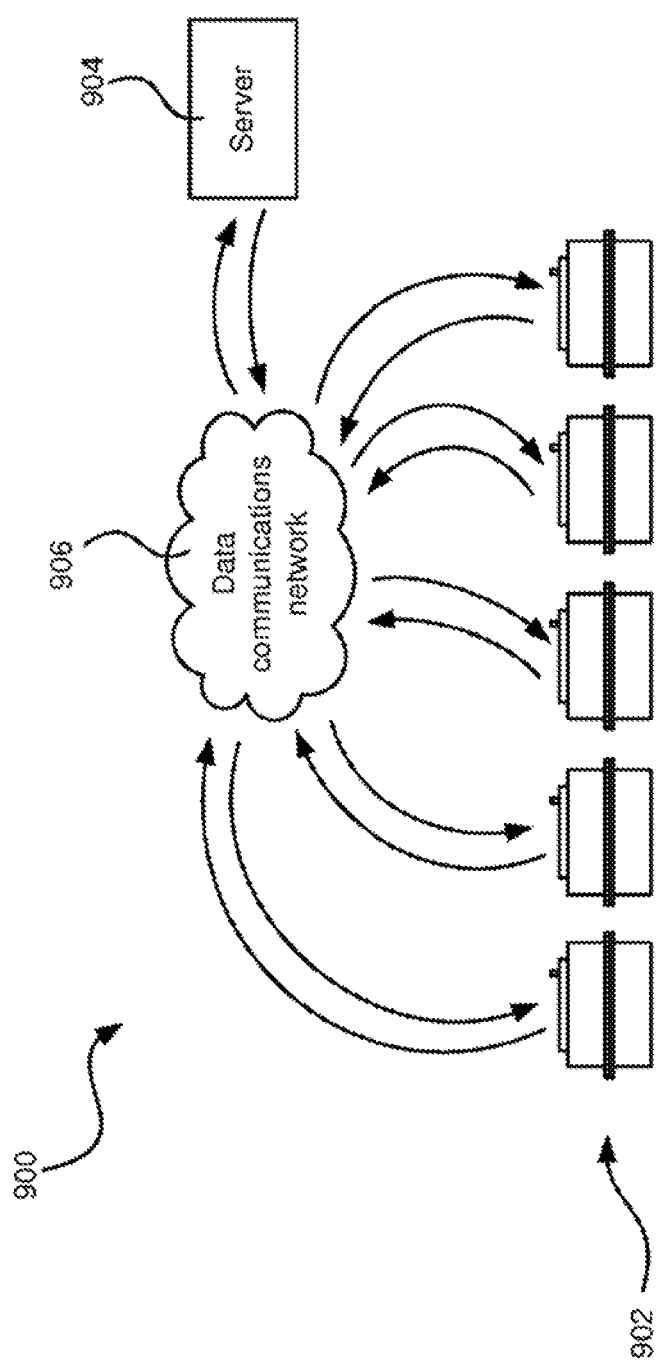
FIG. 9 illustrates a closed moulds communicating with a server via a data communications network.

FIG. 9 illustrates a system 900 comprising a number of closed casings 902, similar to the device 800 illustrated in FIG. 8, communicating with a server 904 via a data communications network 906. The server 904 can be configured to upload instructions to the casings before the pressing starts, which may be at the same time as the gas pressure in the closed casings 902 are lowered, e.g. by pumping out air from the closed casing. The uploaded instructions may comprise information on when and how much air that should be let in, e.g. by opening the valves, at different stages of the pressing. Further, the server may be configured to download data from the moulds after the pressing in order to make sure that the pressing has been performed according to plan.

Further, the server may be configured to download out of control messages and data from the moulds when mould processes are out of normal controls. Even the server may be configurated to upload altered instructions in these occasions.

Figure 10:
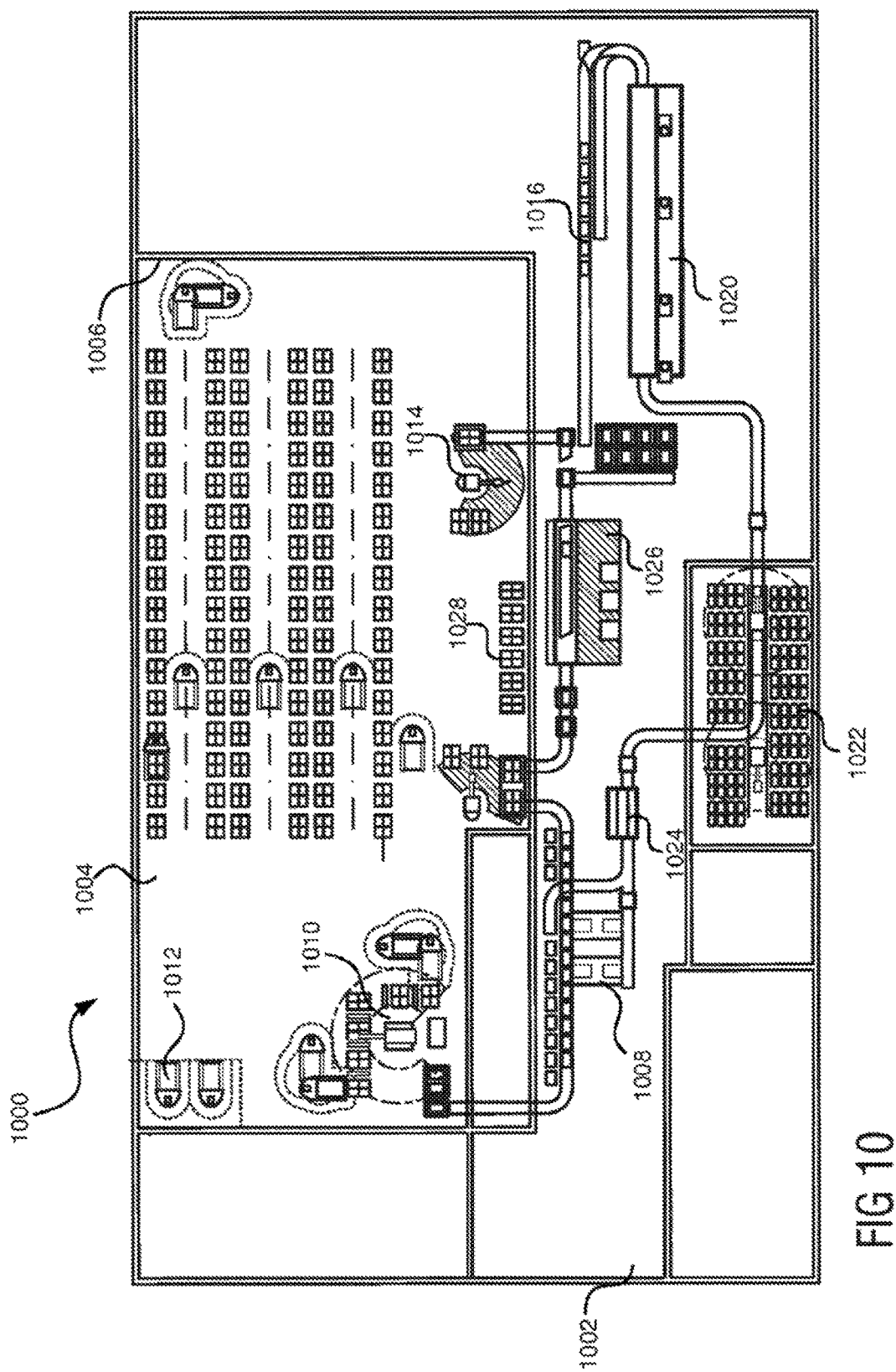
FIG. 10 illustrates an overview of a cheese production system having a storage room for keeping closed moulds during pressing.

FIG. 10 illustrates an example flow chart of a part of a cheese production system 1000 for Gouda cheese or another type of cheese. The production area is divided in main areas, a curd and cheese handling area 1002 and a pressing area 1004. The two areas may be divided by a wall 1006.

Generally, the cheese production line is divided in two loops, one for handling moulds filled with curd and whey mixture, also referred to only as curd, or cheeses, and one for handling casings enclosing the moulds.

Starting with the loop for handling the moulds, the curd and whey mixture is filled into moulds in a filler 1008. In this example, two parallel fillers are used in order to make sure that an appropriate capacity is reached, but also to make sure that production can continue during service of one of the fillers. The fillers may be provided with a cone shaped sieve for reducing the amount of whey filled into the moulds. The cone shaped sieve may further rotate and thus making use of the centrifugal force providing for that further whey is released from the curd and whey mixture before this is fed into the moulds.

After having filled curd and whey mixture into the mould, a lid is placed on top of the curd and whey mixture. In this example the lid is loosely fitted in the mould since during pressing the lid will be pressed down such that whey is released from curd and whey mixture via openings in the mould.

The moulds may be placed in trays before being filled with curd and whey mixture. The tray may have the purpose of holding the pressed out whey, but also by being combined with a cover a closed casing may be formed around the mould such that contaminants from the surroundings are prevented from coming in contact with the curd and whey mixture held in the mould. In this example, after having filled curd and whey mixture in the mould and having placed the lid on top of the curd and whey mixture the cover is placed on top of the tray such that the closed casing is formed.

After the mould is placed in the casing and this is closed the casing is fed from the curd and cheese handling area 1002 to the pressing area 1004, in this example via a lock. Since the curd and whey mixture is closed off from the surroundings by the casing there is no need to keep the pressing area as clean as is required e.g. in the curd and cheese handling area, in which the curd and whey mixture is in direct contact with the surroundings. An implication of this is in turn that it is possible to use e.g. robots and automated guided vehicles (AGVs) for handling the casings, since most of these are not designed to fulfill food safety standards.

Further, it is also an effect of having the curd and whey mixture closed off from the surroundings that less cleaning is needed in the pressing area compared to pressing areas where the curd and whey mixture is in direct contact with the surroundings. This of course makes it possible to lower the operational cost.

When being transferred into the pressing area 1004, air is pumped out of the casing in a vacuum pump station 1010 such that a lowered gas pressure in the casing is formed, as further described in relation to FIG. 8.

At this stage, or as early as directly during filling the curd and whey mixture into the mould, instructions on a pressing cycle may be uploaded to a controller in the casing. In many pressing cycles, the pressure applied onto the curd and whey mixture starts low and is successively increased. If having a casing as illustrated in FIG. 8, this can imply that the low starting pressure is achieved by pumping out air from both the first and second space and then sucessively letting air in the second space such that a pressure difference is formed and successively increased by letting in more air. The uploaded instructions may be general instructions used for all casings for all batches, but more logically the instructions may also be adapted to perfectly fit a current batch of curd and whey mixture by forming the instructions based on input from the curd and whey mixture preparation, and/or the instructions may also be adapted to fit different combinations of casings and moulds individually.

After air has been pumped out from the casing and instructions have been uploaded casings can be stacked by a robot arm and transported by an AGV 1012 to a storage position. Stacking can also been done prior to pumping out air from the casings. In this particular example, the storage area is a room next to the curd and cheese handling area, but it would also be possible to press the curd and whey mixture while transporting the casings from one site to another. The pressing could also be done outside in open air storage as the curd and whey mixture and latter cheese are enclosed by the closed casings.

After pressing, the casing is picked up by the AGV 1012 from the storage position and transported to a pressing end station 1014 in which data gathered during the pressing can be downloaded and the casing can be placed on a conveyor transporting the casing from the pressing area back to the curd and cheese handling area. In this particular example, there is one and the same curd and cheese handling area for handling curd and whey mixture before pressing and cheeses after pressing, but in another embodiment there may be several curd and cheese handling areas, such as one curd and cheese handling area handling curd and whey mixture before pressing and another cheese and curd handling area, that may be located at a different site if e.g. pressing is made under transportation, for handling cheeses after pressing.

When the casing re-enters the cheese and curd handling area 1002 the casing is opened and the mould holding a cheese, formed during the pressing, is removed from the casing.

Figure 14:
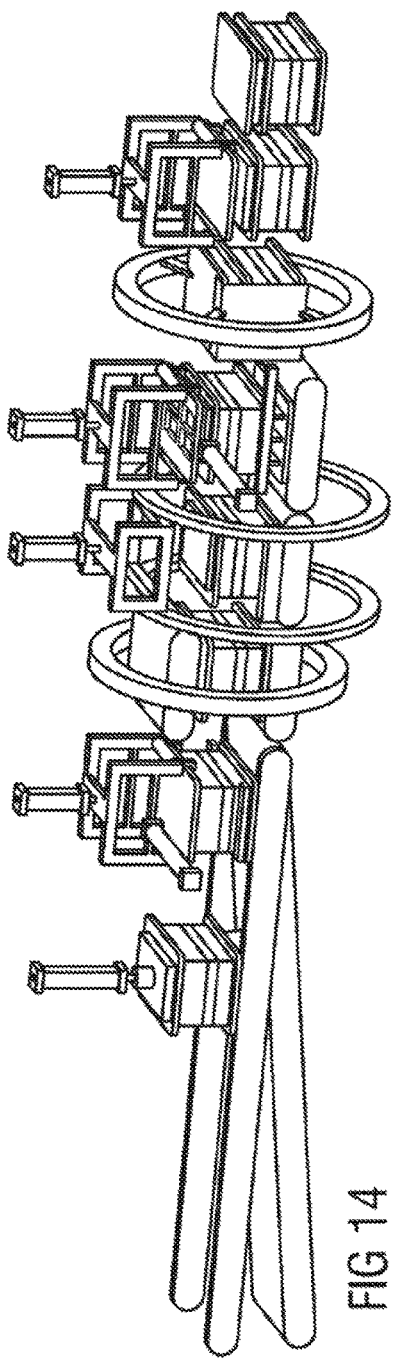
FIG. 14 illustrates an example of a demoulding apparatus that can be used in the cheese production system illustrated in FIG. 10.

The mould is thereafter transferred to a de-moulding apparatus 1016 in which the cheese is released from the mould, as is illustrated more in detail in FIG. 14. Thereafter the moulds and cheeses are transported in parallel conveyor lines. In this particular example the cheese are transported on a cheese conveyor placed below a mould conveyor, as illustrated in FIG. 14.

In case round cheeses are being produced the cheeses may after being released from the mould be transferred to an apparatus 1018 configured to provide for that any edges, so called press-rinds, of the cheeses formed during pressing are removed such that round cheeses without edges are achieved.

After having released the cheeses from the moulds, the cheeses are transported to a brine bath and for ripening (not illustrated in FIG. 10).

The moulds are transported to a cleaning station 1020 in which the different parts of the moulds are cleaned. The moulds may comprise a main part and a lid as illustrated in FIG. 8, but as an alternative they may also comprise a main part formed as a sleeve, a lid and a loose bottom, in line with moulds illustrated in FIG. 14.

After having cleaned the moulds they are transported to a storage room 1022. In case the same format is to be used for another batch the moulds can be transferred through the storage room directly to the filler 1008. Before reacting the filler the moulds are passed via an apparatus 1024 separating the lid and the main part from each other such that the mould is ready to receive the curd and whey mixture. At this position mould parts can also be prepared for next cycle of use, for example by disinfecting or cleaning them.

As stated above, the moulds and curd and whey mixture or cheeses are handled in one loop, as described above, while the casings, for example the tray and the cover illustrated in FIG. 8, are handled in another loop.

Since the moulds are placed in the casings during pressing, the two loops coincide in this part of the process. However, after the casings and moulds are separated from each other, that is, after they have been transferred from the pressing area to the curd and cheese handling area, the casings are transferred to a casings cleaning station 1026 for being cleaned before they are transferred back to the pressing area for being stored again. In order to make sure that there will not be a shortage of casings a buffer 1028 of casings may be provided. In order to not recontaminate the casings these can be stored closed. From the pressing area the casings can be transferred back to the curd and cheese handling area such that moulds filled with curd and whey mixture can be placed in the casings. Alternatively, the casings can be transferred directly from the cleaning station 1026 to a position where moulds are placed in the casings.

Figure 11:
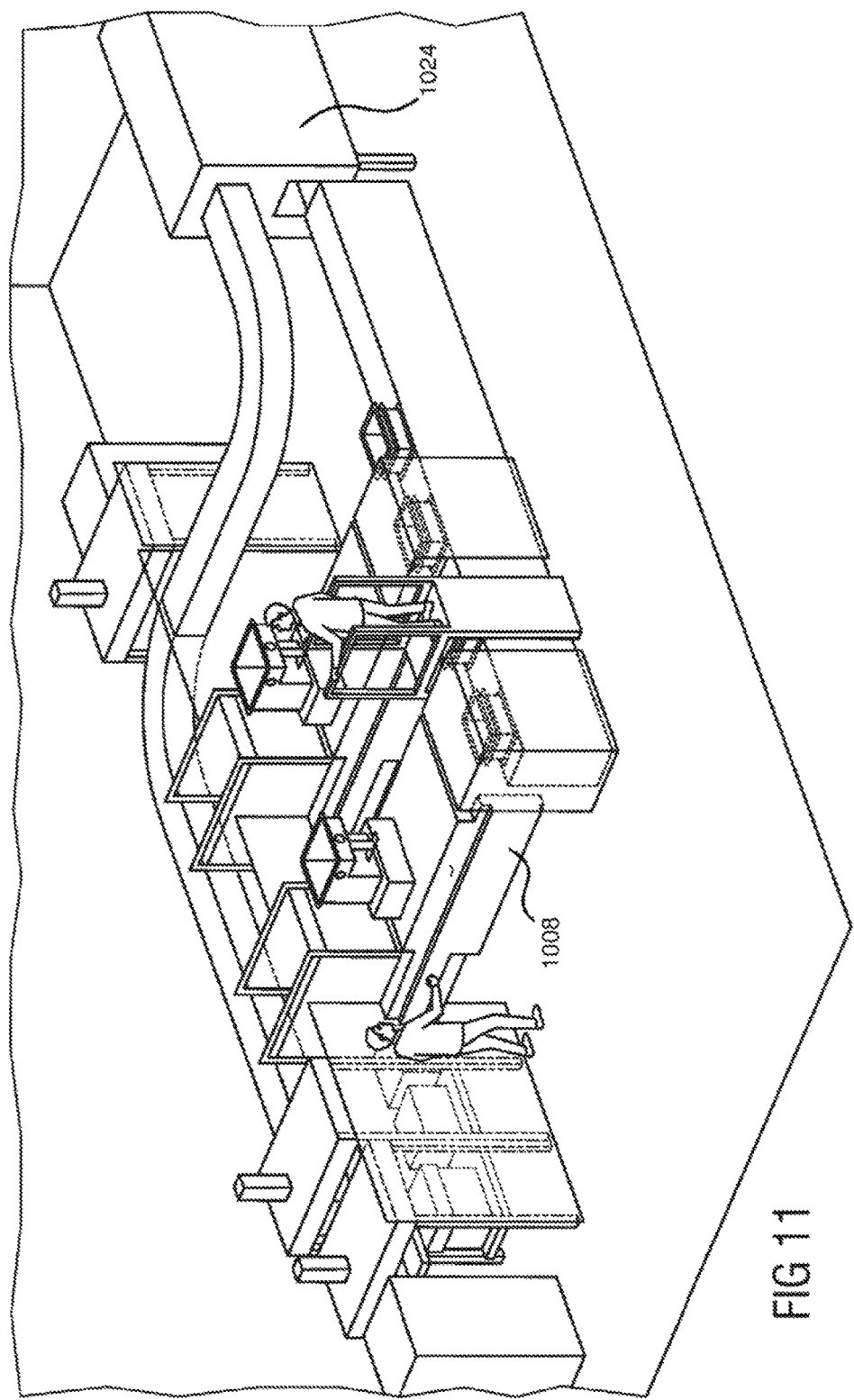
FIG. 11 illustrates an example of two fillers that can be used in the cheese production system illustrated in FIG. 10.

FIG. 11 illustrates an example of how a filler 1008 and an apparatus 1024 could be embodied. Moulds are fed to the apparatus 1024 in which the main part of the mould, either consisting of one pieces or two pieces, such as a sleeve shaped body and a loose bottom section, and a top lid are prepared such that the main part can be filled with curd and whey mixture and the top lid can be applied after the filling.

More in detail, the main parts can be fed via a conveyor to one of two fillers. Each of the fillers may have a conveyor or similar for transporting the mould to a position just beneath a conical sieve arranged to release whey from the curd and whey mixture. Though not illustrated, there can be provided a pipe feeding curd and whey mixture connected to each of the conical sieves.

After the curd and whey mixture is placed in the main parts lids are provided onto the curd and whey mixture, thereafter the moulds with the curd and whey mixture are placed in the casings. Alternatively, the lids are provided onto the curd and whey mixture afterwards the moulds are placed in a lower part of the casings, i.e. the tray, but before an upper part of the casing, i.e. the cover, is placed on top of the tray.

Figure 12:
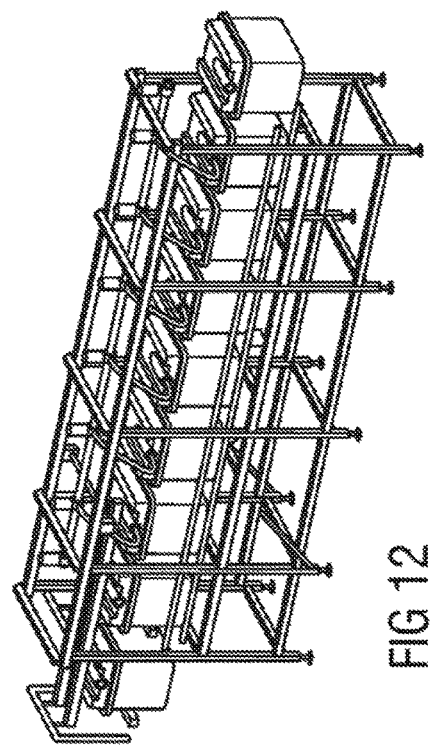
FIG. 12 illustrates an example of a vacuum pump station that can be used in the cheese production system illustrated in FIG. 10.

FIG. 12 illustrates an example of an embodiment of the vacuum pump station. A number of casings, each of them holding a mould with curd and whey mixture, can be connected to a vacuum pump pumping out air from the casings such that a sufficiently low gas pressure is formed in the casings.

Figure 13:
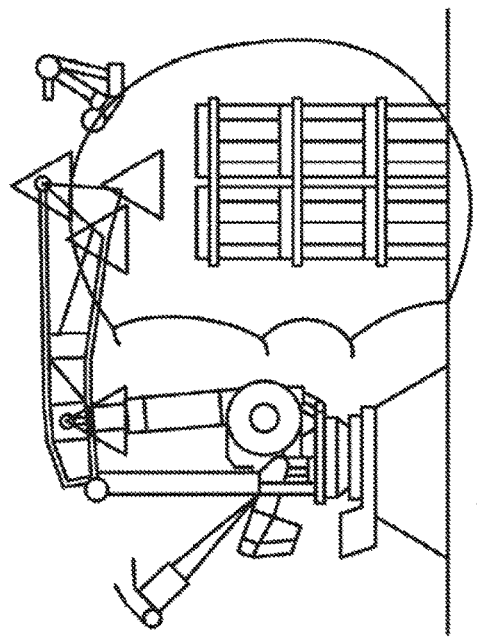
FIG. 13 illustrates an example of a robot that can be used in the cheese production system illustrated in FIG. 10.

In order to store the casings holding the moulds efficiently a number of casings may be stacked for example by a robot as illustrated in FIG. 13, and then placed in rows by AGVs as illustrated in FIG. 10.

FIG. 14 illustrates an example of different steps being performed in the demolding apparatus 1016. More particularly, the example relates to a demoulding apparatus for a mould having a top lid, with a similar function as the lid 806 of the mould illustrated in FIG. 8, a sleeve shaped body and a bottom.

When the mould has been entered into the demoulding apparatus, in a first step, the top lid is released from the cheese by lifting the lid upwards. The lid is however not removed at this stage. Thereafter, in a second step, the mould is turned upside down such that the cheese is placed on top of the lid. When having the mould placed upside down, in a third step, the bottom is released and removed by lifting this upwards.

At this stage, when having released, or in other words loosened, the lid and removed the bottom, and turned the mould upside down, the cheese is at this stage held by the body and placed on the lid. In order to provide for that the cheese can be loosened from the body the body is pushed downwards in a fourth step while the cheese is held back by the lid thus loosening it from the body. If the cheese is not contained as one part or is in any other way damaged this can be detected at this stage, e.g. by using sensors or cameras, and the cheese is in such a case discarded by turning the assembly up-side-down releasing the damaged cheese or non-pressed curd from the mould to a below placed waste bin (not illustrated)

Next, in a fifth step, the mould is turned upside down once again such that the lid is placed upwards and the cheese and mould is supported by a below placed conveyor. Thereafter, in a sixth step, the lid is removed. Since the lid has been released in the first step the risk that the cheese is damaged during this operation is low.

Thereafter, in a seventh step, after having removed both the bottom and the lid, and having released the cheese from the body, the cheese can be removed from the body by holding this in place vertically by a mould conveyor, comprising two elements on which two outer portions of the body is placed, at the same time as a pusher arm is pushing out the cheese from the body by applying a pressure force from above. As the cheese is previously already loosened from the mould most probably cheeses will glide out by gravity and the pusher arm is acting as a reliability feature. When the cheese is removed from the body this gently falls down onto a cheese conveyor placed below the mould conveyor.

Figure 15:
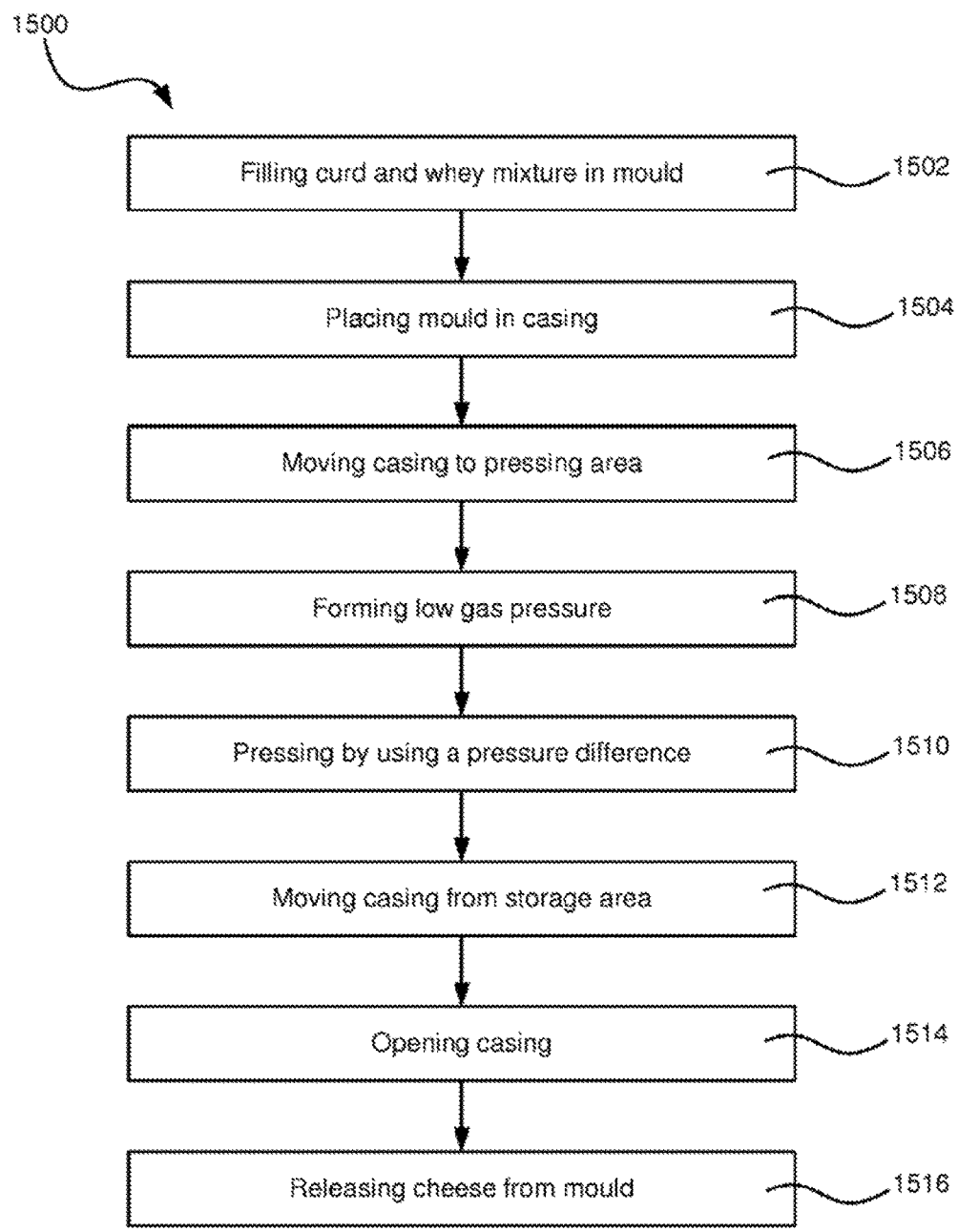
FIG. 15 illustrates a scheme of a method for cheese production using closed moulds.

FIG. 15 illustrates a flow chart 1500 illustrating a method for forming a cheese from a curd and whey mixture.

In a first step 1502 curd and whey mixture is filled in a mould. The mould may be a two part mould comprising a main part and a lid as illustrated in FIG. 8 or a three part mould as illustrated in FIG. 14.

After the mould is filled with the curd and whey mixture it is placed in a casing, in a step 1504. The casing may comprise a tray and a cover as illustrated in FIG. 8. The lid can be placed on the mould prior to placing the mould in the casing or after the mould is placed in the casing, but at least before the casing is closed to by placing the cover on top of the tray.

After the casing has been closed with the cover, this can be transferred to a pressing area, step 1506. The pressing area can be an area separated, e.g. a by a wall, from a curd and cheese handling area, as illustrated in FIG. 10. Since the curd and whey mixture is closed off from the surroundings when being enclosed in the casings it is e.g. possible to use AGVs, robots and other non-food safety approved equipment in the pressing area. The use of this kind of equipment will lower the operational cost, but also since a minor area is necessary to keep clean according to food safety regulations the operational cost will also be reduced due to lower costs for cleaning, house keeping and atmospheric control In order to provide for that pressing can take place a low gas pressure is formed in the casing by pumping out air from the casing, step 1508. This can be done in the pressing area, but it could also be done in the curd and cheese handling area before moving the casing to the pressing area.

Next, in step 1510, a cheese is formed from the curd and whey mixture by applying a pressure on the curd and whey mixture. A pressing cycle may vary, but according to one pressing cycle a first part of the pressing cycle may applying a relatively low pressure and then increasing the pressure sucessively in next steps. Since increasing the pressure can be achieved by opening a valve of the casing, that is, by releasing air from the atmosphere to the second space, this can be achieved by having the casing provided with a battery and a controller connected to the valves.

After having pressed the curd and whey mixture into a cheese the casing is moved from the pressing area to the curd and cheese handling area, step 1512. As described above, in the example illustrated in FIG. 10, one and the same area is used for both curd and cheese handling, but it is also possible to have one area for curd handling and one area for cheese handling, which may be the case if e.g. pressing is made during transportation. Most often, in the end of the pressing the curd and whey mixture has been transformed into a cheese keeping together on its own.

After receiving the casing this is opened, step 1514, and the cheese is released from the mould, step 1516. The cheese may thereafter be transferred to brine bath and from there to ripening.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for pressing out whey from curd, said method comprising;
   receiving a closed casing holding a mould filled with curd,
   pumping out air from said closed casing such that a pressure force onto said curd can be formed,
   establishing a connection between a system controller and a casing controller provided in said casing,
   uploading instructions from said system controller to said casing controller on how to change said pressure force during a pressing cycle by opening a valve on said casing,
   de-establishing said connection between said system controller and said casing controller,
   storing said closed casing and executing said instructions uploaded to said closed casing such that whey is pressed out from said curd and a cheese is formed from said curd,
   wherein said pressure force onto said curd is formed by having a first space between a lid placed on top of said curd and a movable element and a second space between said movable element and said casing, the movable element comprising two resiliently spaced apart plates, and
   wherein a pressure difference between said first space and said second space provides for said movable element to be pressed onto said lid such that in turn said pressure force is formed onto said curd.

2. The method according to claim 1, wherein said moveable element is disposed between the lid and a membrane.

3. The method according to claim 1, said method further comprising:
   receiving curd related data relating to said curd by said system controller, and
   preparing said instructions by taking into account said curd related data.

4. The method according to claim 1, said method further comprising:
   identifying said mould by reading a mould identification tag placed on said mould, and
   preparing said instructions based on mould properties related to said mould.

5. The method according to claim 4, wherein said mould identification tag is an RFID tag.

6. The method according to claim 1, said method further comprising:
   identifying said casing by reading a casing identification tag placed on said casing, and
   preparing said instructions based on casing properties related to said casing.

7. The method according to claim 6, wherein said casing identification tag is an RFID tag.

8. The method according to claim 1, further comprising:
   receiving said closed casing after whey has been pressed out from said curd,
   establishing a connection between said system controller and said casing controller placed in said casing,
   downloading predetermined parameter data related to said pressing from said casing controller to said system controller, and
   de-establishing said connection between said system controller and said casing controller.

9. The method according to claim 8, said method further comprising adapting said instructions based on said parameter data.

10. The method according to claim 1, further comprising:
   detecting a deviation in said pressing when executing said instructions,
   establishing a connection between said system controller and said casing controller placed in said casing,
   downloading predetermined parameter data related to said pressing from said casing controller to said system controller, and
   de-establishing said connection between said system controller and said casing controller.

11. A system configured to press out whey from curd, said system comprising:
   a casing holding a mould filled with curd, a first space, a second space and a movable element comprising two resiliently spaced apart plates disposed within an interior of said casing,
   wherein said casing is provided with at least one connection pipe such that air can be pumped out from said casing such that a pressure force onto said curd can be formed, a valve such that air can be let in to said casing, and a casing controller controlling said valve,
   a pump apparatus arranged to pump out air from said casing via said at least one connection pipe,
   a system controller arranged to process data, and
   a data transfer apparatus arranged to provide a connection between said casing controller and said system controller for uploading instructions from said system controller to said casing controller on how to change said pressure force by opening said valve on said casing,
   wherein said pressure force onto said curd is formed by having the first space between a lid placed on top of said curd and the movable element and the second space between said movable element and said casing, and
   wherein a pressure difference between said first space and said second space provides for said movable element being pressed onto said lid such that in turn said pressure force is formed onto said curd.

12. The system according to claim 11, wherein said moveable element is disposed between the lid and a membrane.

13. The system according to claim 11, wherein said system controller is further configured to receive curd related data relating to said curd, and prepare said instructions by taking into account said curd related data.

14. The system according to claim 11, further comprising:
   a mould identification tag reader arranged for identifying said mould by reading a mould identification tag placed on said mould, and
   said system controller configured to retrieve mould properties related to said mould from a mould database by using said mould identification tag and prepare said instructions based on mould properties.

15. The system according to claim 11, said system further comprising:
   a casing identification tag reader arranged for identifying said casing by reading a casing identification tag placed on said casing, and
   said system controller configured to retrieve casing properties related to said casing from a casing database by using said casing identification tag and prepare said instructions based on casing properties.

16. The system according to claim 11, wherein said data transfer apparatus is further configured to provide a connection between said system controller and said casing controller after whey has been pressed out from said curd for downloading predetermined parameter data related to said pressing cycle from said casing controller to said system controller.

17. The system according to claim 16, wherein said system controller is further configured to adapt said instructions based on said parameter data.

18. The system according to claim 11, wherein said instructions are adapted to said casing individually.

19. The system according to claim 11, wherein said data transfer apparatus is further configured to provide a connection between said system controller and said casing controller, if a deviation in said pressing cycle is detected, for downloading parameter data related to said pressing cycle from said casing controller to said system controller.

* * * * *